United States Patent [19]

Iwase et al.

[11] 4,167,923
[45] Sep. 18, 1979

[54] ELECTRONIC IGNITION TIMING CONTROL SYSTEM FOR INTERNAL COMBUSTION ENGINES

[75] Inventors: Kazuo Iwase, Okazaki; Hisasi Kawai, Toyohashi, both of Japan

[73] Assignee: Nippon Soken, Inc., Nishio, Japan

[21] Appl. No.: 825,052

[22] Filed: Aug. 16, 1977

[30] Foreign Application Priority Data

Sep. 6, 1976 [JP] Japan .................. 51/107151

[51] Int. Cl.$^2$ .............................. F02P 5/04
[52] U.S. Cl. ..................... 123/117 D; 123/117 R
[58] Field of Search ....... 123/117 D, 117 R, 146.5 A, 123/32 EB, 32 EC; 364/424, 431, 442

[56] References Cited
U.S. PATENT DOCUMENTS

| | | | |
|---|---|---|---|
| 3,749,073 | 7/1973 | Asplund | 123/117 D |
| 3,752,139 | 8/1973 | Asplund | 123/117 D |
| 3,871,342 | 3/1975 | Fujinami et al. | 123/117 R |
| 3,927,648 | 12/1975 | Kawai et al. | 123/117 D |
| 3,935,846 | 2/1976 | Zelenka | 123/117 D |
| 3,986,006 | 10/1976 | Kawai et al. | 123/32 EB |
| 4,009,699 | 3/1977 | Hetzler et al. | 123/117 D |
| 4,018,197 | 4/1977 | Salway | 123/117 D |
| 4,018,202 | 4/1977 | Gartner | 123/117 D |
| 4,036,190 | 7/1977 | Bigliani et al. | 123/117 D |
| 4,052,967 | 10/1977 | Colling et al. | 123/117 D |
| 4,063,539 | 12/1977 | Gorille et al. | 123/117 D |
| 4,068,631 | 1/1978 | Lombard et al. | 123/117 D |
| 4,099,507 | 7/1978 | Pagel et al. | 123/117 D |

*Primary Examiner*—Charles J. Myhre
*Assistant Examiner*—Andrew M. Dolinar
*Attorney, Agent, or Firm*—Cushman, Darby & Cushman

[57] ABSTRACT

In response to the input signal corresponding to the rotational speed of an internal combustion engine, a first read-only memory generates a binary coded signal indicative of the corresponding preliminarily written ignition retard angle from a predetermined angular position of the engine crankshaft, and in response to the input signal corresponding to the intake manifold vacuum a second read-only memory generates a binary coded signal indicative of the corresponding preliminarily written ignition retard angle. The output signals of the read-only memories are added together by an adder. A comparator compares the output signal of the adder with the number of clock pulses corresponding to the rotational angle of the crankshaft, and the ignition timing is determined by the output of the comparator.

4 Claims, 9 Drawing Figures

ELECTRONIC IGNITION TIMING CONTROL SYSTEM FOR INTERNAL COMBUSTION ENGINES

BACKGROUND OF THE INVENTION

1. Field of the Invention

The present invention relates to an electronic ignition timing control system for internal combustion engines (hereinafter referred to as engines) for electronically determining the ignition timing of the engine.

2. Description of the Prior Art

In the past, distributors conventionally used for determining the ignition timing of engines have been so designed that in the electric contact unit employing a cam and points, the relative positions of the various elements are varied in accordance with the engine rotational speed and the magnitude of the intake manifold vacuum respectively detected by the centrifugal governor and the vacuum advancer, thus generating an ignition signal at the proper ignition point corresponding to the operating conditions of the engine.

A disadvantage of this method is that all the necessary controls are effected mechanically, thus deteriorating the reliability of the ignition timing, making it difficult to provide an ideal ignition timing characteristic and giving rise to problems from the standpoint of exhaust emission controls which are now receiving attention.

Also an electronically controlled ignition system has been proposed in which the ignition timing is determined by dividing a predetermined ignition advance angle by the engine rotationl speed and converting into a time. A disadvantage of this prior art system is that since it is necessary to measure the engine rotational speed thus requiring a time for measuring the speed, the value of the engine rotational speed represents the average engine rotational speed within such measuring time, and consequently any change in the speed during the measuring time tends to cause an error. To overcome this difficulty, another system has been proposed in which a plurality of slits each corresponding to a predetermined crank angle are formed in the periphery of a disk, and the ignition timing is determined by detecting the proper slit. A disadvantage of this system is that in actual practice, if the interval between the slits corresponds to 2° of crank travel and the disk is mounted on the crankshaft, it is necessary to form 180 slits in the disk, and consequently this system is not fit for use in practical application in consideration of the required processing capacity and the capacity and durability of a sensor for detecting the slits.

SUMMARY OF THE INVENTION

In view of these deficiencies, it is the object of the present invention to provide an electronic digital ignition timing control system in which the values preliminarily increased by 2.56 times and corresponding to an ignition retard angle due to engine rotational speed and an ignition retard angle due to intake vacuum in relation for example to a predetermined reference angular position of the engine before the top dead center, are read out from two predetermined programs, and a total angle of ignition retard obtained by adding the retard angle values together is subjected to comparison in a comparator which receives as input clock pulses the frequency multiplied signals obtained by multiplying by a factor of 8 the crank angle signals produced by a ring gear at the rate of 115 signals per revolution thereof and the total retard angle as an input data, thereby determining the ignition timing. Thus, the system of the present invention is advantageous in that the necessary rotational speed detecting means can be manufactured easily, that the danger of aging is eliminated, that an ignition timing with a very high degree of accuracy can be obtained, that the ignition timing characteristics can be changed easily by changing the programs, that there is no need to use any complicated computing circuits, and that the computing time is practically eliminated by virtue of the digital method, namely, an improved response is ensured.

DESCRIPTION OF THE PREFERRED EMBODIMENTS

The present invention will now be described in greater detail with reference to the illustrated embodiments.

Figure 1:
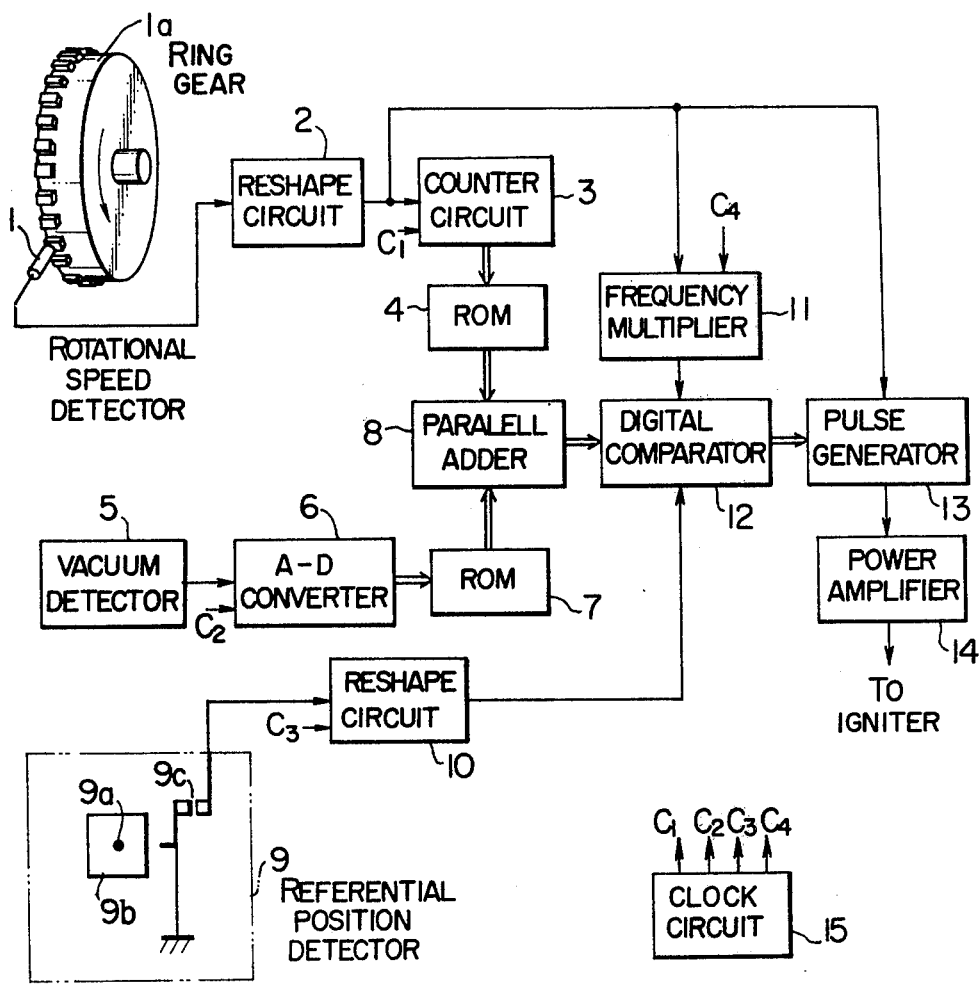
FIG. 1 is a block diagram showing the general construction of a first embodiment of a system according to this invention.
Figure 2A:
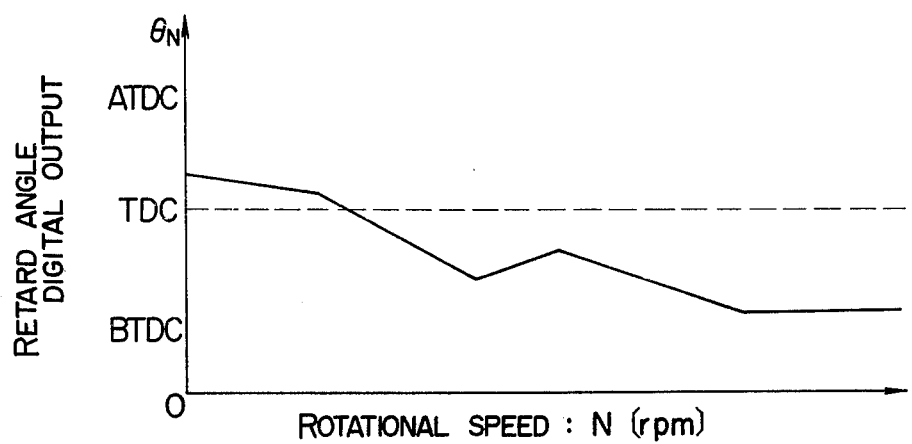
FIGS. 2(a) and 2(b) are ignition retard characteristic diagrams showing the programs stored in the read-only memories 4 and 7.

Referring to the block diagram of FIG. 1 showing the general construction of a first embodiment of the system of this invention, numeral 1 designates an engine rotational speed detector comprising an electromagnetic pickup mounted to detect the rotational speed of the engine by utilizing a ring gear 1a of the engine, whereby if the number of the teeth formed at equal intervals on the ring gear 1a is 115, its output detection signal will have a frequency of 1150 Hz at the engine rotational speed of 600 rpm. Numeral 2 designates a known type of reshape circuit for amplifying the output signals of the engine rotational speed detector 1 and changing their waveform into a rectangular waveform, 3 a counter circuit for detecting the engine rotational speed in accordance with the signals from the reshape circuit 2 and clock pulses $C_1$ from a clock circuit 15 which will be described later, and its output is generated in binary code form. Numeral 4 designates a read-only memory (hereinafter referred to as an ROM) which receives the output of the counter circuit 3 as its input address and into which are preprogrammed the values of the ignition retard angle $\theta_N$ related to the engine rotational speed N and increased by 2.56 times (because the number of the teeth on the ring gear 1a is 115 and the frequency multiplier circuit 11 multiplies by 8) as shown in FIG. 2a, and its output is generated in binary code form.

Figure 2B:
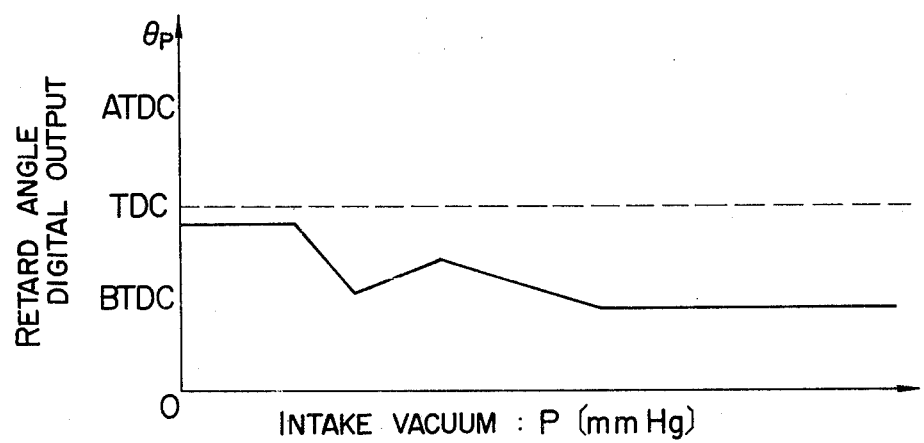

Numeral 5 designates a semiconductor-type vacuum detector for detecting, for example, the vacuum in the intake manifold as a parameter indicative of the load condition of the engine, which is mounted in the intake manifold of the engine to detect the vacuum in the intake manifold and generate an analog voltage. Numeral 6 designates an A/D converter for converting the output voltage of the vacuum detector 5 into a digital form in response to clock pulses $C_2$ from the clock circuit 15 which will be described later, and the A/D converter 6 includes a memory circuit. Numeral 7 designates an ROM which receives the output of the A/D converter 6 and into which are pre-programmed the values of the ignition retard angle $\theta_p$ related to the vacuum P and increased by 2.56 times (because the number of the teeth on the ring gear 1a is 115 and the frequency multiplier circuit 11 multiplies by 8) as shown in FIG. 2b, and its output is generated in a binary code form. Numeral 8 designates a parallel adder for parallely adding together the binary coded outputs of the ROMs 4 and 7. The ROM 4 constitutes an engine rotational speed retard angle setting circuit, and the ROM 7 constitutes a vacuum retard angle setting circuit. Also in FIGS. 2a and 2b, a symbol TDC on the ordinate indicates the top dead center position, BTDC indicates the positions before the top dead center, and ATDC indicates the positions after the top dead center. Numeral 9 designates a referential position detector for detecting a reference angular position, which comprises a shaft 9a (e.g., the camshaft) which is rotated at a rotational speed which is ½ the engine rotational speed, a quadrisecting cam 9b and contacts 9c adapted to be opened and closed by the cam 9b, whereby the contacts 9c are opened and closed four times every revolution of the camshaft 9a. In other words, the detector 9 is identical with the distributor of the conventional ignition system excluding the centrifugal governor and the vacuum advancer. Numeral 10 designates a reshape circuit for changing the output signal of the referential position detector 9 into a rectangular wave. Numeral 11 designates a frequency multiplier circuit for multiplying the output frequency of the reshaper circuit 2 by a factor of 8. Numeral 12 designates a digital comparator comprising a counter, exclusive circuits and a logical circuit, and the comparator 12 is designated so that it is reset by an output signal of the reshape circuit 10, begins a comparison operation by receiving the output signals of the frequency multiplier circuit 11 as input clock pulses, and generates an output signal when the number of the clock pulses received reaches the output of the adder 8 or the total retard angle. This output signal determines the ignition timing. Numeral 13 designates a known type of pulse generator which is responsive to the pulse signal from the comparator 12 and comprising a decoder/counter and an R-S flip-flop, whereby in response to the output signal of the comparator 12 and the crank angle signals from the reshape circuit 2, pulse signals are generated which correspond to 62.6° in terms of the crank travel by 3.13° (the crank angle per pulse from the reshaper circuit 2)×20 (the number of pulses). Numeral 14 designates a known type of power amplifier circuit for power amplifying the output signal of the pulse generator 13 to actuate an igniter (not shown). Numeral 15 designates a clock circuit comprising a known type of rectangular oscillator circuit, a frequency divider for dividing the frequency of the oscillator output, a reshaper circuit for converting the frequency divider output into pulses of a narrow pulse width and a logical circuit, whereby generating clock pulses $C_1$ to $C_4$ which are reference timing signals to the blocks 3, 6, 10 and 11. Although not shown, the counter circuit 3 comprises a NAND gate which is opened by the output signals of the reshape circuit 2 to pass the clock pulses $C_1$ from the clock circuit 15 which will be described later, a counter for counting the number of the clock pulses passed through the NAND gate, a latch circuit (temporary memory circuit) for temporarily storing the count value of the counter and determining by an output binary code an address for the ROM 4, and a signal generator responsive to the output signal of the reshape circuit 2 to generate a reset signal for the counter and a memory command signal for the latch circuit. Also, to determine the proper address for the ROM 7, the A/D converter 6 comprises a counter for counting the clock pulses $C_2$ from the clock circuit 15 which will be described later, a latch circuit (temporary memory circuit), a signal generator for generating reset signals for the counter at a predetermined period and a comparator, whereby the analog output of the vacuum detector 5 corresponding to the intake vacuum is compared with a stairstep wave output corresponding to the output of the counter in the comparator, so that when the two outputs agree with each other and the comparator generates an output, namely, when the output of the counter attains a value corresponding to the detected vacuum, the output of the comparator is applied to the latch circuit as a memory command signal and the then current output of the counter is stored in the latch circuit whose output binary code determines the proper address for the ROM 7.

Here, the necessity of the programmed values in the ROMs 4 and 7 being the retard angle values increased by 2.56 times as mentioned previously, will now be explained. Since the engine rotational speed detector 1 employs the engine ring gear 1a as mentioned previously, if the number of teeth M of the ring gear 1a is 115, for example, the interval between the teeth is given as 360/115÷3.13°, and this corresponds to 3.13° of crank travel. This interval is further multiplied by 8 in the frequency multiplier circuit 11 whose multiplication factor is N, and consequently the period of the output signals of the frequency multiplier circuit 11 is given as 3.13/8÷0.39° which in turn corresponds to 0.39° of crank travel. The output of the frequency multiplier circuit 11 is connected to the comparator 12, and thus the minimum unit of input clock pulses to the comparator 12 is equal to 0.39° of crank travel. Thus, in order to make the minimum unit of the other input correspond to 0.39° of crank travel, since the minimum unit of the retard angle values is equal to 1° of crank travel and so 1/0.39=2.56, the desired retard angle value $\alpha$ must be increased by 2.56 times in order that the minimum unit may correspond to 0.39° of crank travel. For this reason, the values pre-programmed into the ROMs 4 and 7 represent the values $\theta$ obtained by increasing the retard angle values $\alpha$ by 2.56 times. Generalizing this, it is only necessary to divide the entire circumference of 360° of the ring gear 1a by the number of teeth M of the ring gear, divide by the resulting quotient the multiplication factor for multiplying the frequency of clocks corresponding to the teeth of the ring gear 1a, multiply by the resulting constant value the engine speed retard angles and vacuum angles, respectively, and then pre-program the resulting values into the ROMs 4 and 7, respectively. Here, the term "retard angle" is used in such a way that if a reference position is set at 60° before the top dead center, then 40° ignition retard corresponds to 20° ignition advance in a general sense. Thus, the retard angle means the number of degrees of retard from the reference position, and the advance angle means the number of degrees of advance from the top dead center. As a result, whether the ignition is advanced or retarded depends on the position taken as a reference position, and the term "advance angle" will be used in the discussion to follow.

Figure 3:
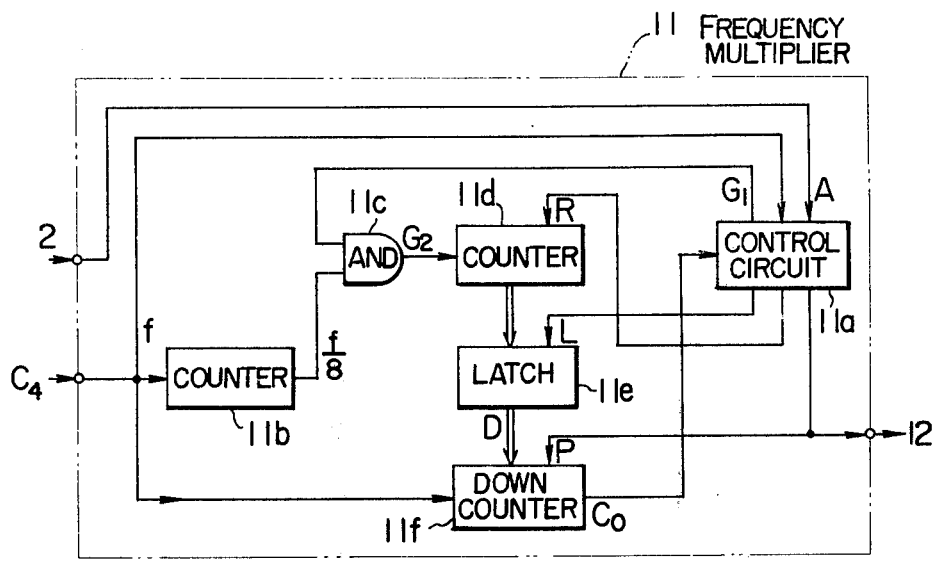
FIG. 3 is a block diagram showing the construction of the frequency multiplier circuit shown in FIG. 1.
Figure 4:
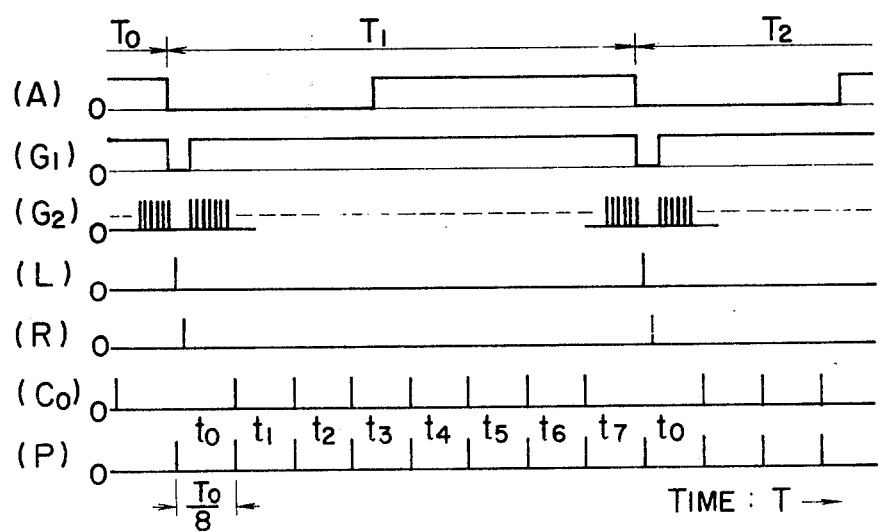
FIG. 4 is a waveform diagram useful for explaining the operation of the frequency multiplier circuit shown in FIG. 3.

Next, the frequency multiplier circuit 11 will be described with reference to FIGS. 3 and 4. Numeral 11a designates a control circuit which is responsive to the clock pulses $C_4$ from the clock circuit 15 and the signals generated from the reshape circuit 2 and shown in (A) of FIG. 4 for generating control signals to control other circuits, and the control circuit 11a comprises a decoder/counter, a D-type flip-flop and a plurality of gates to thereby generate the signals shown in ($G_1$), (L), (R) and (P) of FIG. 4. Numeral 11b designates a counter for dividing by a factor of 8 the frequency of the clock pulses $C_4$ from the clock circuit 15. Numeral 11c designates an AND gate for performing the AND operation on the signal $G_1$ from the control circuit 11a and the signals from the counter 11b to generate and apply to a counter 11d the clock pulses shown in ($G_2$) of FIG. 4. The counter 11d is reset by the reset signal R shown in (R) of FIG. 4. Numeral 11e designates a latch circuit (temporary memory circuit) which is responsive to the latch signal L shown in (L) of FIG. 4 to store the binary coded output of the counter 11d. Numeral 11f designates a preset down counter so designated that it is preset to the output signal D of the latch circuit 11e in response to the application to its preset input of the signal shown in (L) of FIG. 4. This preset value is counted down in response to the clock pulses $C_4$ so that when the preset value is reduced to 0, a signal is generated at its carryout terminal $C_o$. Upon the generation of the signal at the carry-out terminal $C_o$, the control circuit 11a generates a preset signal P. When this occurs, the preset down counter 11f is again preset to the output data D of the latch circuit 11e and the present value is counted down until it is reduced to 0 at which a signal is generated again at the carry-out terminal $C_o$. In this way, signals are successively generated at the carry-out terminal $C_o$ as shown in ($C_o$) of FIG. 4, and consequently preset signals P are generated as shown in (P) of FIG. 4. It is to be noted that since the frequency of the clock pulses applied to the counter 11d is about f/8 and the frequency of the clock pulses applied to the down counter 11f is f, if the time required for the counter 11f to count the data D is $T_o$, then the time required for the down counter 11f to count down the data D to 0 will be about $T_o/8$. Consequently, pulses with a period $T_o/8$ or 8 preset signals P are generated during the time $T_o$, and signals multiplied by 8 are produced.

Figure 5:
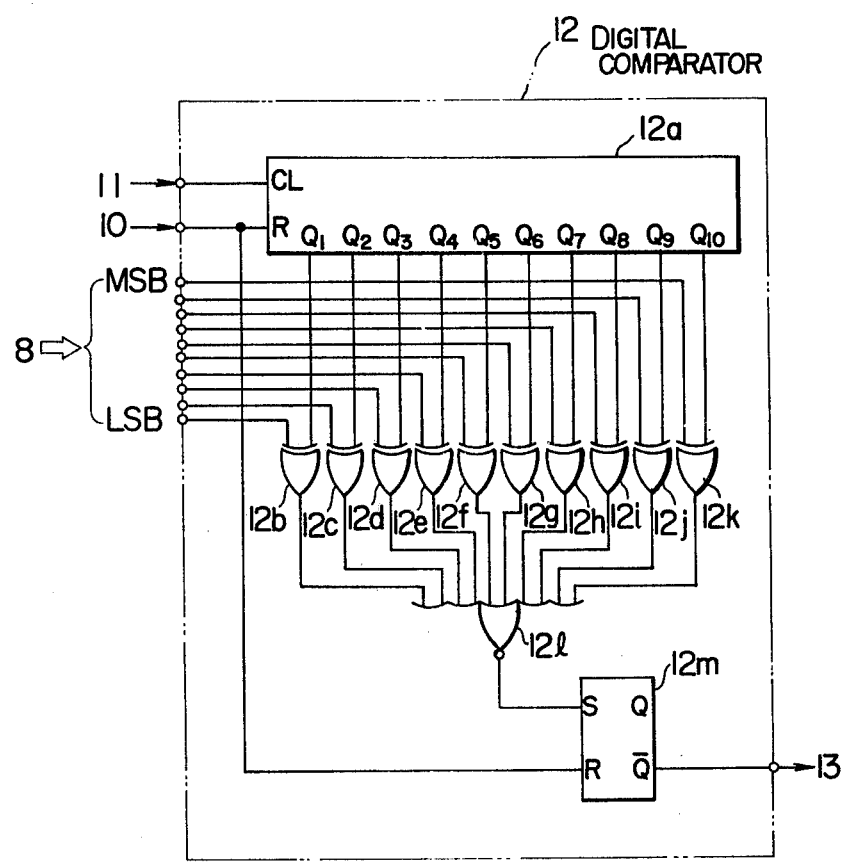
FIG. 5 is a circuit diagram showing the construction of the comparator 12 shown in FIG. 1.

Next, the comparator 12 will be described with reference to FIG. 5. The comparator 12 comprises a binary counter 12a, EXCLUSIVE OR gates 12b, 12c, 12d, 12e, 12f, 12g, 12h, 12i, 12j and 12k, a NOR gate 12l and an R-S flip-flop 12m. In operation, the binary counter 12a and the R-S flip-flop 12m are reset by the output signal of the reshape circuit 10, and the binary counter 12a starts counting the output signals of the frequency multiplier circuit 11. When the output signals of the frequency multiplier circuit 11 attain the output of the adder 8, the R-S flip-flop 12m is set through the EXCLUSIVE OR gates 12b to 12k and the NOR gate 12l, thus causing its inverted output $\overline{Q}$ to change from "1" to "0". The time interval between the instant that the R-S flip-flop 12m is reset and the instant that it is set is proportional to the output binary code of the adder 8. It is important to note that the instant at which the inverted output $\overline{Q}$ of the R-S flip-flop 12 changes from "1" to "0" corresponds to the output of the adder 8 or the desired total advance angle and hence the desired ignition timing. This ignition timing signal is applied to the pulse generator circuit 13 so that a "0" level signal is generated for the duration of a time interval from the angular position at which the ignition timing signal is generated until 20 pulse signals (each corresponding to 3.13° of crank travel) are generated from the reshaper circuit 2 (62.6° of crank travel), and thereafter a "1" level signal is generated until the next ignition timing signal is generated (about 117.4° of crank travel). This signal is amplified by the power amplifier circuit 14 and energizes the ignition coil through the igniter. So long as a "1" level signal is being generated from the pulse generating circuit 13, current is supplied to the primary winding of the ignition coil, and the current flow is interrupted during the time that a "0" level signal is generated. When the current flow is interrupted, a high voltage is induced in the secondary winding of the ignition coil so that this high voltage is distributed to the spark plug in each cylinder through the distributor which is not shown and an ignition spark is produced at the spark plug.

Figure 6:
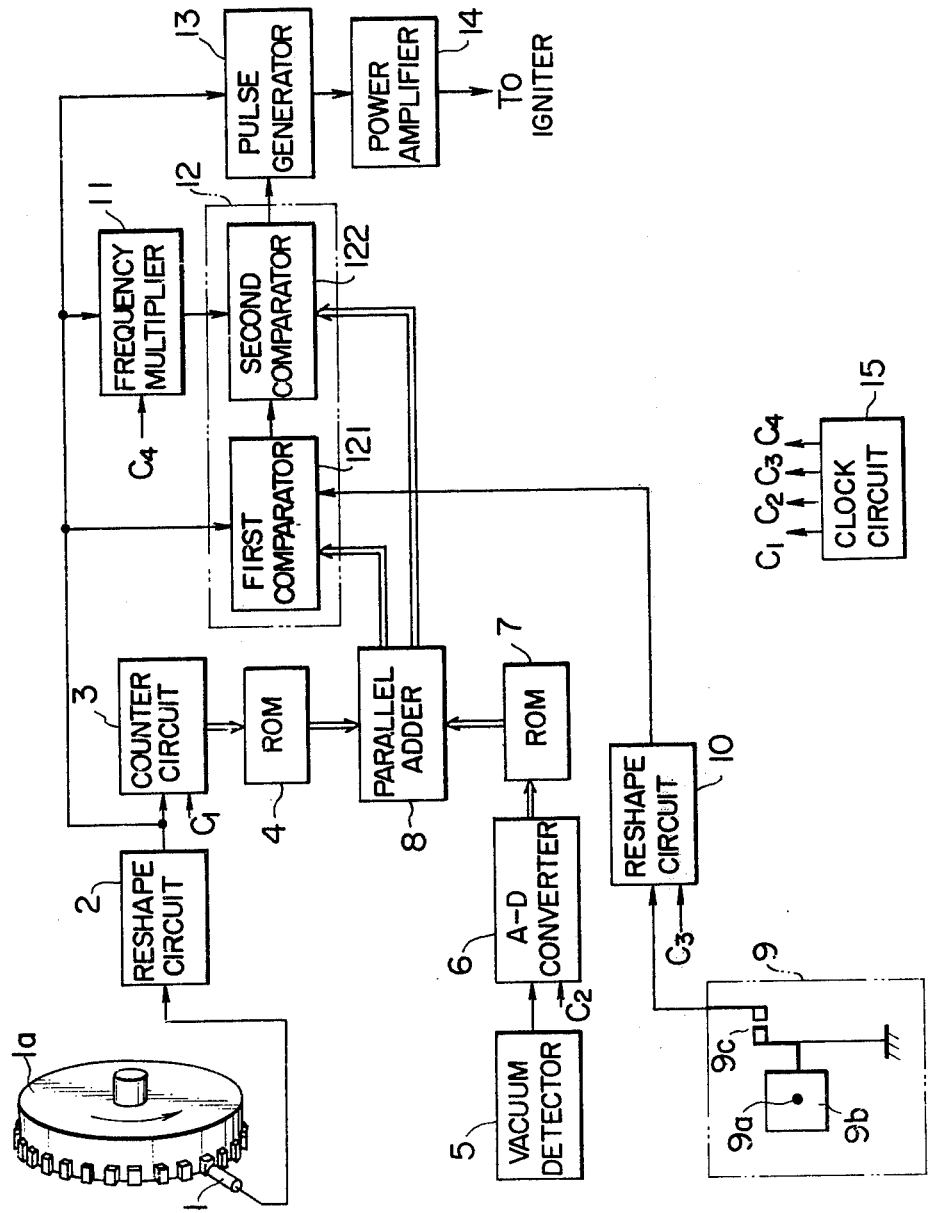
FIG. 6 is a block diagram showing the general construction of a second embodiment of the system of this invention.
Figure 7:
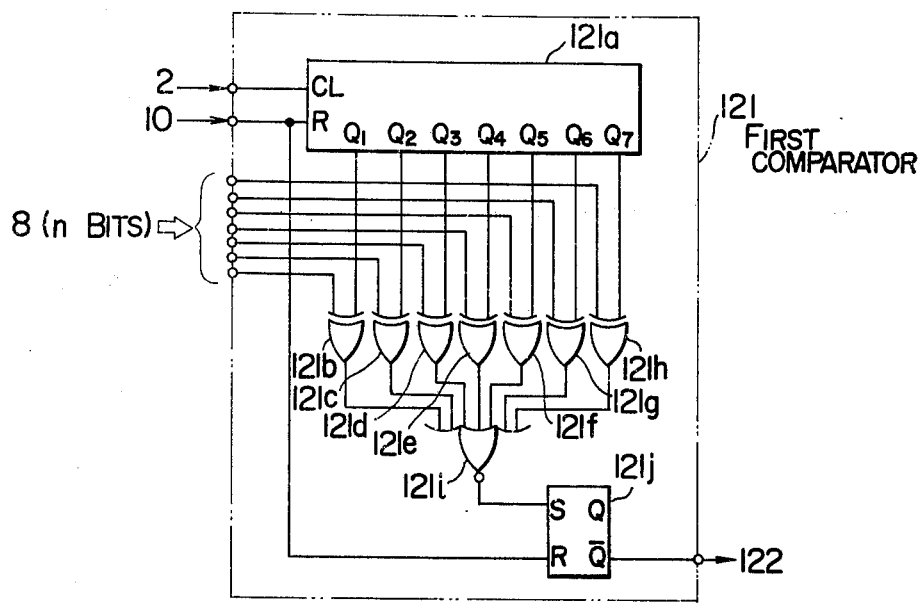
FIG. 7 is a circuit diagram showing the construction of the first comparator 121 shown in FIG. 6.
Figure 8:
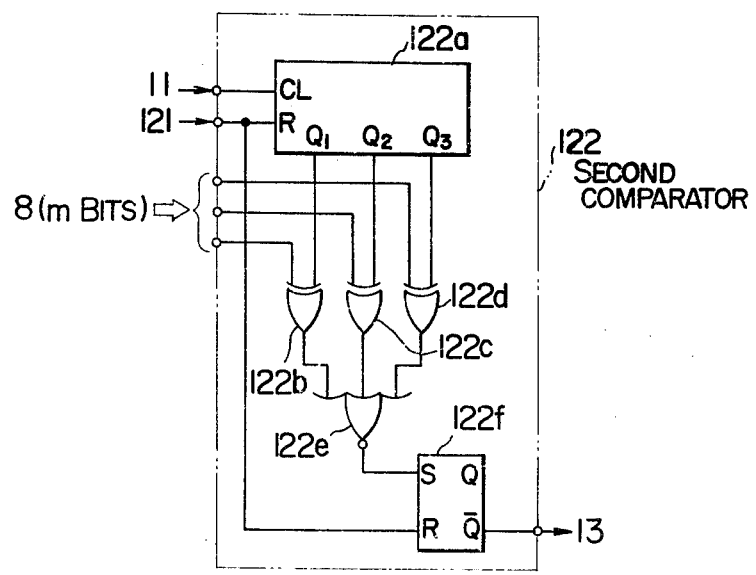
FIG. 8 is a block diagram showing the construction of the second comparator 122 shown in FIG. 6.

FIG. 6 shows a second embodiment of the invention which differs from the first embodiment in that the comparator 12 is divided into first and second comparators 121 and 122. Referring now to FIG. 7 showing the construction of the first comparator 121, it comprises a binary counter 121a, EXCLUSIVE OR gates 121b, 121c, 121d, 121e, 121f, 121g and 121h, a NOR gate 121i and an R-S flip-flop 121j. Referring to FIG. 8 showing the construction of the second comparator 122, it comprises a binary counter 122a, EXCLUSIVE OR gates 122b, 122c and 122d, a NOR gate 122e and an R-S flip-flop 122f. In operation, the first comparator 121 is reset by the output signal of the reshape circuit 10 and the first comparator 121 starts counting the output signals of the reshape circuit 2 as input clocks. When the count value of the binary counter 121a attains the binary code represented by the higher n bits (upper 7 bits in this embodiment) of the adder 8, the output of the comparator 121 changes from "1" to "0". When this occurs, the resetting of the second comparator 122 is released and it starts counting the output signals of the frequency multiplier circuit 11 as input clocks. When the count value of the second comparator 122 attains the binary code represented by the lower m bits (lower 3 bits in this embodiment) of the adder 8, the output of the second comparator 122 changes from "1" to "0", and this corresponds to the desired ignition timing. While, in this embodiment, the frequency of the input clocks to the first comparator 121 is ⅛ that of the input clocks to the second comparator 122, only the fourth and higher bits of the output binary code of the adder 8 are applied to the first comparator 121, and consequently there is no possibility of any computing error due to the difference in input frequency. In other words, where the multiplication factor of the frequency multiplier circuit 11 is $2^x$, the (x+1)th and higher bits of the adder 8 are applied to the first comparator 121, and the x-th and lower bits of the adder 8 are applied to the second comparator 122. If the functions of the first and second comparator 121 and 122 are compared to that of a vernier caliper used to measure length of something, the first comparator 121 corresponds to the main scale which makes a rough measurement of the angles exactly corresponding to the variations in the engine rotational speed, and the second comparator 122 corresponds to the auxiliary scale which functions to subdivide the divisions of the main scale and measure finer crank angles.

The advantages of the two embodiments of this invention may be summarized as follows:

(1) Higher operating stability is ensured against the external conditions such as the variations of the power supply voltage, ambient temperature, etc., owing to all the control signals being digital signals.

(2) Owing to all the circuitry being constructed using digital computing elements, it is possible to reduce the manufacturing cost and realize standardization of the assemblying operations by integrated circuit techniques.

(3) When it is desired to change the design of ignition timing characteristic due to a change in the intended purposes of the engine or change in the type of engine, it is only suffice to change the programs of the read-only memories, and any desired ignition timing characteristic can be easily obtained.

(4) By virtue of the fact that a comparison is made by using as data input a total advance angle including an advance angle due to engine rotational speed and an advance angle due to intake vacuum (advance angles due to cooling water temperature, exhaust gas amount, etc.) and the frequency multiplied output signals of the frequency multiplier circuit as an input clock pulses, it is possible to ensure improved response, simplify the construction of the circuitry due to abscense of such complicate computing circuits as used in electronic desk computers, and ensure improved accuracy.

(5) The system of this invention can be fitted on the body of any existing engine without any modification but by simply arranging an electromagnetic pickup to cooperate with the teeth of the ring gear and mounting an engine referential position detector on a shaft (e.g., the camshaft) which is driven at ½ the engine speed.

While, in the above-described embodiments, the engine rotational speed detector 1 comprises an electromagnetic pickup, the engine rotational speed detector 1 may be constructed using a Hall element.

Further, while, in the above-described embodiments, the referential position detector 9 is of the contact type comprising the cam 9b and contacts 9c, it is possible to use a contactless detector such as one comprising an inductor having as many lobes as there are the cylinders and an electromagnetic pickup, or one comprising a screen disk having as many slits as there are the cylinders and a light emitting diode and a phototransistor which are arranged on the sides of the screen disk to oppose each other.

Still further, while, in the above-described embodiments, the engine rotational speed and intake manifold vacuum are detected as engine parameters, other parameters such as the cooling water temperature, exhaust gas amount, etc., may be additionally detected to control the number of degrees of ignition advance.

What is claimed is:

1. An ignition timing control system for an internal combustion engine comprising:

engine rotation detector means for generating an output pulse at each rotation of a predetermined angle of said engine;

clock means for generating clock pulses at a fixed frequency;

counter means, connected to said rotation detector means and said clock means, for counting the clock pulses of said clock means during a duration of the output pulse of said rotation detector means to generate an output signal related to the rotational speed of said engine;

engine load detector means for generating an output signal indicative of the load of said engine;

means for determining a desired ignition retard angle, connected to said counter means and said load detector means, for generating, in response to the output signals of said counter means and said load detector means, an output signal representing a desired ignition retard angle with respect to the rotational rotation and load of said engine;

frequency multiplier means, connected to said speed detector means, for frequency multiplying the output pulses of said rotation detector means by a constant value larger than one to generate output pulses;

reference position detector means, coupled to said engine, for generating an output signal at a predetermined reference position of said engine;

comparator means, connected to said means for determining a desired ignition retard angle, said frequency multiplier means and to said reference position detector means, for initiating a count of the output pulses of said frequency multiplier means in response to the output signal of said reference position detector means to generate an ignition timing signal when the count value thereof corresponds to contents of the output signal of said means for determining a desired ignition retard angle; and igniter means, connected to said comparator means, for igniting said engine in synchronization with said ignition timing signal.

2. An ignition timing control system for an internal combustion engine comprising:

engine rotation detector means for generating an output pulse at each rotation of a predetermined angle of said engine;

clock means for generating clock pulses at a fixed frequency;

counter means, connected to said rotation detector means and said clock means, for counting the clock pulses of said clock means during a duration of the output pulse of said rotation detector means to generate an output signal related to the rotational speed of said engine;

first memory means, connected to said counter means and having programmed therein data outputs corresponding to desired ignition retard angles with respect to the rotational speed of said engine, for generating one of said data outputs in said first memory means in response to the output signal of said counter means;

engine load detector means for generating an output signal indicative of the load of said engine;

second memory means, connected to said load detector means and having programmed therein data outputs corresponding to desired ignition retard angles with respect to the load of said engine, for generating one of said data outputs in said second memory means in response to the output signal of said load detector means;

parallel adder means, connected to said first and second memory means, for summing the data outputs of said first and second memory means to generate an output signal;

frequency multiplier means, connected to said rotation detector means, for frequency multiplying the output pulses of said rotation detector means by a constant value larger than one to generate output pulses;

reference position detector means, coupled to said engine, for generating an output signal at a predetermined reference position of said engine;

comparator means, connected to said parallel adder means, said frequency multiplier means and to said position detector means, for initiating a count of the output pulses of said frequency multiplier means in response to the output signal of said reference position detector means to generate an ignition timing signal when the count value thereof corresponds to contents of the output signal of said parallel adder means; and igniter means, connected to said comparator means, for igniting said engine in synchronization with said ignition timing signal.

3. An ignition timing control system according to claim 2, wherein each of the data outputs of said first and second memory means in a binary signal representing an angle $\theta$ in degrees calculated in accordance with the following equation:

$$\theta = \alpha.M.N/360$$

wherein the symbol $\alpha$ is a desired retard angle in degrees, the symbol M is the number of the output pulses to be generated during one revolution of said engine, and the symbol N is the constant value of said multiplier means.

4. An ignition timing control system according to claim 3, wherein the output signal of said parallel adder means is a binary signal consisting of upper bits and lower bits, and wherein said comparator means includes:

a first comparator, connected to said rotation detector means, said parallel adder means and said reference position detector means, for initiating to count the output pulses of said rotation detector means in response to the output signal of said reference position detector means to generate an output signal when the count value thereof reaches contents of the upper bits; and a second comparator, connected to said first comparator said frequency multiplier means and said parallel adder means, for initiating to count the output pulses of said frequency multiplier means in response to the output signal of said first comparator to generate said ignition timing signal when the count value thereof reaches contents of the lower bits.

* * * * *